US012674539B2

(12) United States Patent
Kim et al.

(10) Patent No.: US 12,674,539 B2
(45) Date of Patent: Jul. 7, 2026

(54) SUPPORT APPARATUS AND DISPLAY DEVICE HAVING SAME

(71) Applicant: LG ELECTRONICS INC., Seoul (KR)

(72) Inventors: Hoyoung Kim, Seoul (KR); Heegun Park, Seoul (KR); Weonyoung Sho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 18/861,791

(22) PCT Filed: Jul. 5, 2022

(86) PCT No.: PCT/KR2022/009663
§ 371 (c)(1),
(2) Date: Oct. 30, 2024

(87) PCT Pub. No.: WO2024/010106
PCT Pub. Date: Jan. 11, 2024

(65) Prior Publication Data

US 2025/0297702 A1 Sep. 25, 2025

(51) Int. Cl.
*F16M 11/08* (2006.01)
*F16M 11/06* (2006.01)
*F16M 11/20* (2006.01)

(52) U.S. Cl.
CPC ............. *F16M 11/08* (2013.01); *F16M 11/06* (2013.01); *F16M 11/2014* (2013.01); *F16M 2200/08* (2013.01)

(58) Field of Classification Search
CPC .... F16M 11/08; F16M 11/06; F16M 11/2014; F16M 2200/08
See application file for complete search history.

(56) References Cited

U.S. PATENT DOCUMENTS 3,183,545 A * 5/1965 Bergstrom ............. A47B 91/06
248/346.11
4,640,485 A * 2/1987 Day ...................... F16M 11/18
248/920
(Continued)

FOREIGN PATENT DOCUMENTS

CN 211176074 U 8/2020
DE 102009022383 A1 * 11/2010 ............... F16M 5/00
(Continued)

OTHER PUBLICATIONS

Machine translation of KR 20050065965 (Year: 2005).*
International Search Report for PCT/KR2022/009663 (PCT/ISA/210) mailed on Mar. 24, 2023.

*Primary Examiner* — Taylor Morris
(74) *Attorney, Agent, or Firm* — Birch, Stewart, Kolasch & Birch, LLP

(57) ABSTRACT

A support device according to an embodiment of the present invention includes: a stand body supporting the display panel; a swivel ring rotatably placed on a bottom surface of the stand body; a swivel cover fixed to the bottom surface of the stand body on an inner side of the swivel ring and supporting an inner edge of the swivel ring; a stand base fixed to the bottom surface of the stand body and supporting an outer edge of the swivel ring; and a fixing pad mounted on a bottom surface of the swivel ring and in close contact with an installation surface on which the display panel is placed.

19 Claims, 15 Drawing Sheets

(56) References Cited

U.S. PATENT DOCUMENTS

| | | | | |
|---|---|---|---|---|
| 5,024,415 | A * | 6/1991 | Purens | F16M 11/126 |
| | | | | 248/371 |
| 5,243,434 | A * | 9/1993 | Nodama | F16M 11/18 |
| | | | | 348/827 |
| 5,683,068 | A * | 11/1997 | Chase | F16M 11/2014 |
| | | | | 248/920 |
| 6,129,092 | A * | 10/2000 | Mondl | B08B 1/14 |
| | | | | 15/210.1 |
| 6,227,518 | B1 * | 5/2001 | Sun | F16M 11/10 |
| | | | | 248/371 |
| 6,338,464 | B1 * | 1/2002 | Jen-Hsiang | F16M 11/08 |
| | | | | 219/755 |
| 6,921,057 | B2 * | 7/2005 | Chen | F16M 11/24 |
| | | | | 248/920 |
| 7,303,174 | B2 * | 12/2007 | Li | F16M 11/2014 |
| | | | | 248/346.06 |
| 7,440,038 | B2 * | 10/2008 | Kato | F16M 11/2014 |
| | | | | 348/790 |
| 8,264,838 | B2 | 9/2012 | Fujikawa et al. | |
| 8,368,821 | B2 * | 2/2013 | Yokota | F16M 11/12 |
| | | | | 361/679.02 |
| 8,823,883 | B2 * | 9/2014 | Kim | F16M 11/22 |
| | | | | 248/309.2 |
| 9,657,895 | B2 * | 5/2017 | Chen | F16M 13/022 |
| 9,685,984 | B1 * | 6/2017 | Majumdar | F16M 11/10 |
| 11,006,745 | B1 * | 5/2021 | Szymanski | A47B 23/043 |
| 11,054,080 | B2 * | 7/2021 | Yeh | F16M 11/04 |
| 12,196,358 | B2 * | 1/2025 | Che | F16C 19/06 |
| 2002/0149906 | A1 | 10/2002 | Ichimura | |
| 2005/0121583 | A1 * | 6/2005 | Cavello | A47B 49/00 |
| | | | | 248/349.1 |
| 2005/0258334 | A1 | 11/2005 | Hwang et al. | |
| 2007/0152114 | A1 | 7/2007 | Choi | |
| 2007/0210223 | A1 * | 9/2007 | Lee | F16M 11/18 |
| | | | | 248/178.1 |
| 2007/0221798 | A1 * | 9/2007 | Lin | F16M 11/08 |
| | | | | 248/176.1 |
| 2008/0006748 | A1 * | 1/2008 | Watanabe | F16M 11/22 |
| | | | | 248/186.2 |
| 2008/0035821 | A1 | 2/2008 | Kameoka et al. | |
| 2008/0111928 | A1 * | 5/2008 | Yokota | F16M 11/12 |
| | | | | 348/836 |
| 2010/0231815 | A1 | 9/2010 | Kim et al. | |
| 2011/0138666 | A1 * | 6/2011 | Borde | A47G 1/166 |
| | | | | 40/747 |
| 2012/0019990 | A1 * | 1/2012 | Segar | F16M 11/24 |
| | | | | 361/679.01 |
| 2012/0106093 | A1 | 5/2012 | Takao | |
| 2012/0212886 | A1 * | 8/2012 | Chou | F16M 11/2014 |
| | | | | 361/679.01 |
| 2018/0200569 | A1 * | 7/2018 | Blitstein | A63B 26/003 |
| 2019/0309894 | A1 | 10/2019 | Hasegawa et al. | |
| 2022/0124927 | A1 * | 4/2022 | Yamada | H04N 5/64 |
| 2023/0024932 | A1 * | 1/2023 | Tator | G03B 37/02 |

FOREIGN PATENT DOCUMENTS

| | | | | |
|---|---|---|---|---|
| EP | 1 803 988 A3 | 10/2008 | | |
| EP | 2 372 219 A1 | 10/2011 | | |
| EP | 2429187 A2 * | 3/2012 | | H04N 5/64 |
| EP | 3 565 240 A1 | 11/2019 | | |
| JP | H0719239 U * | 4/1995 | | |
| JP | 2002311845 A * | 10/2002 | | G06F 1/1601 |
| JP | 2007-295476 A | 11/2007 | | |
| KR | 10-2000-0073217 A | 12/2000 | | |
| KR | 100431344 B1 * | 5/2004 | | G06F 1/1601 |
| KR | 20050065965 A * | 6/2005 | | |
| KR | 10-0609852 B1 | 8/2006 | | |
| KR | 10-2007-0022920 A | 2/2007 | | |
| KR | 10-0955480 B1 | 4/2010 | | |
| KR | 10-2011-0007291 A | 1/2011 | | |
| KR | 20110030801 A * | 3/2011 | | H05K 5/0204 |
| KR | 10-2018-0071667 A | 6/2018 | | |
| KR | 20240011347 A * | 1/2024 | | H04N 5/64 |
| TW | 1348047 B * | 9/2011 | | F16M 11/08 |

* cited by examiner

[FIG. 1]
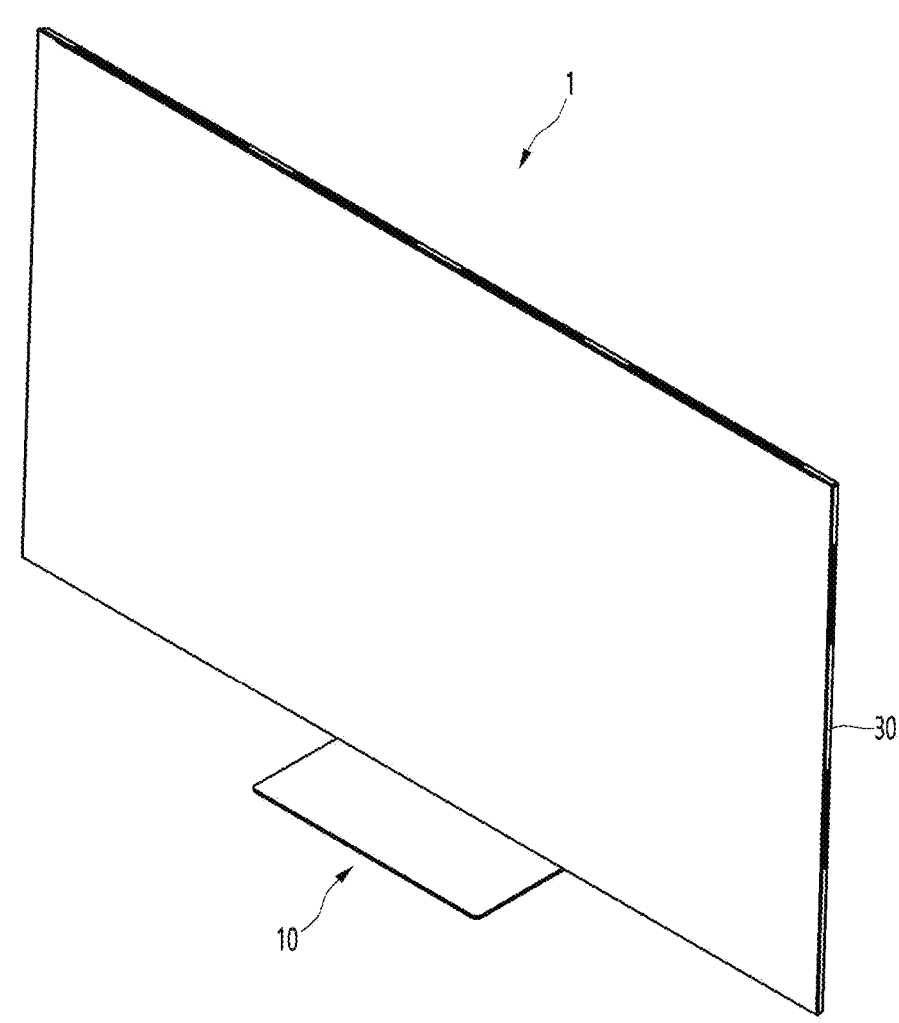

【FIG. 2】
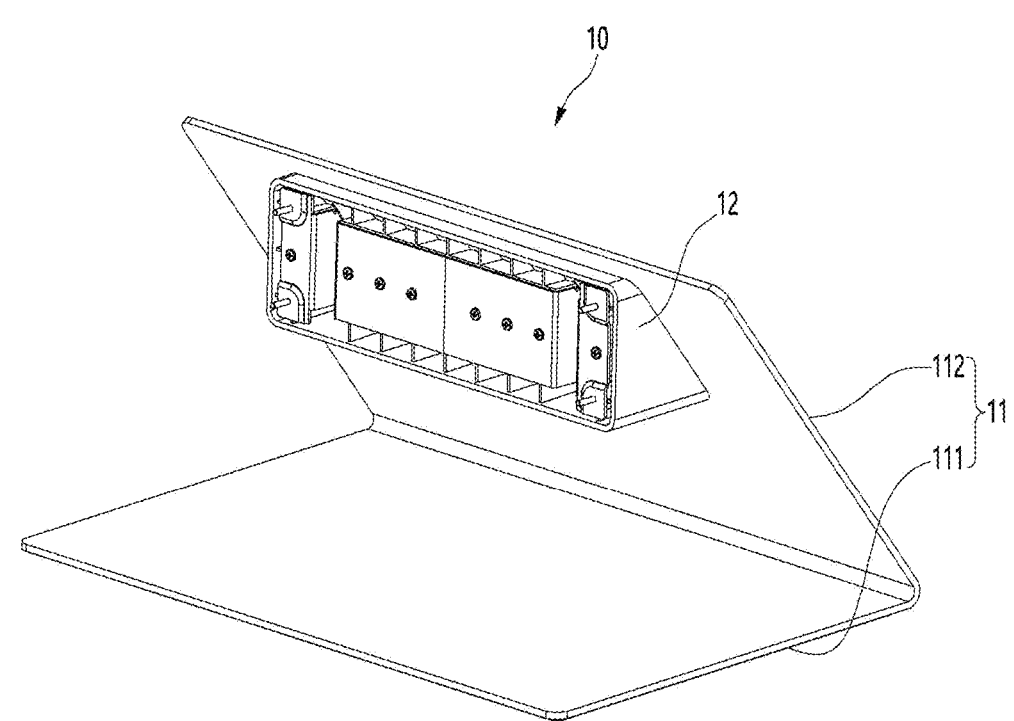

【FIG. 3】
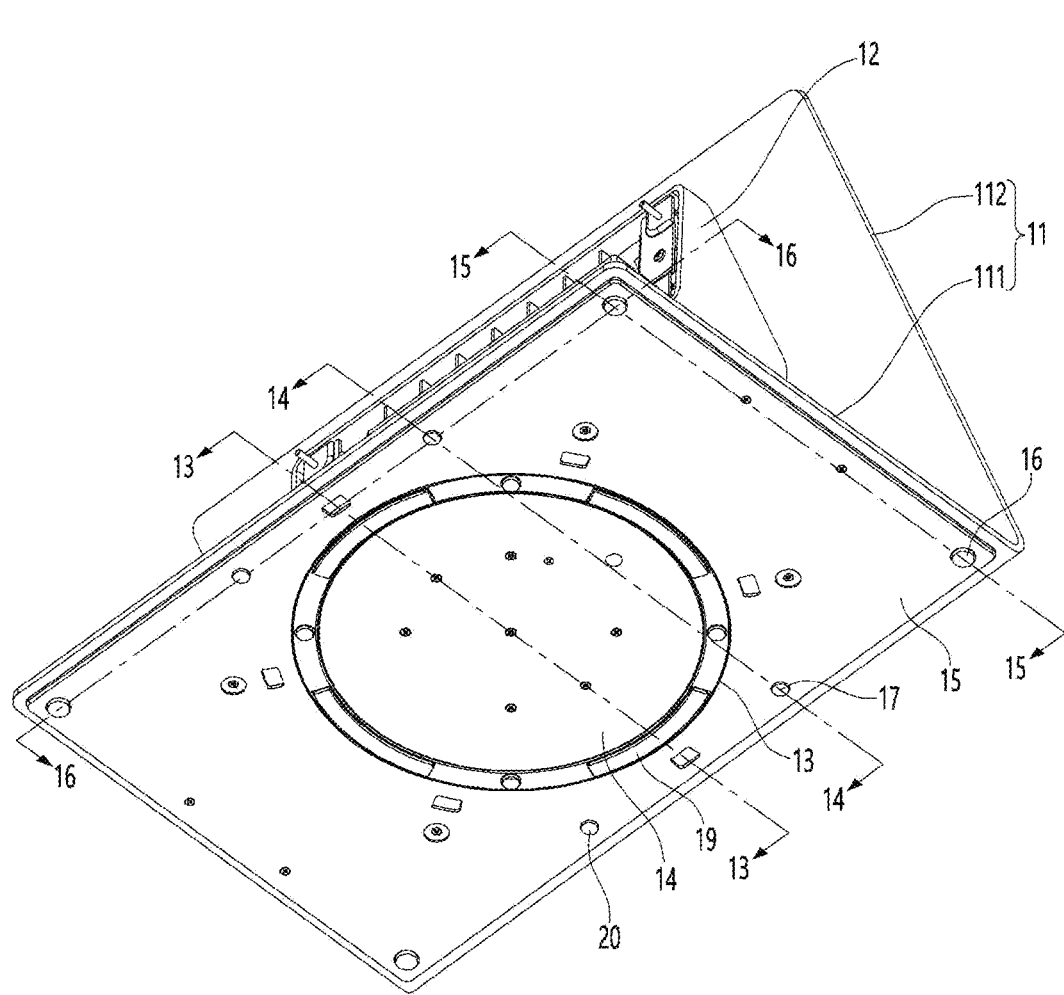

【FIG. 4】
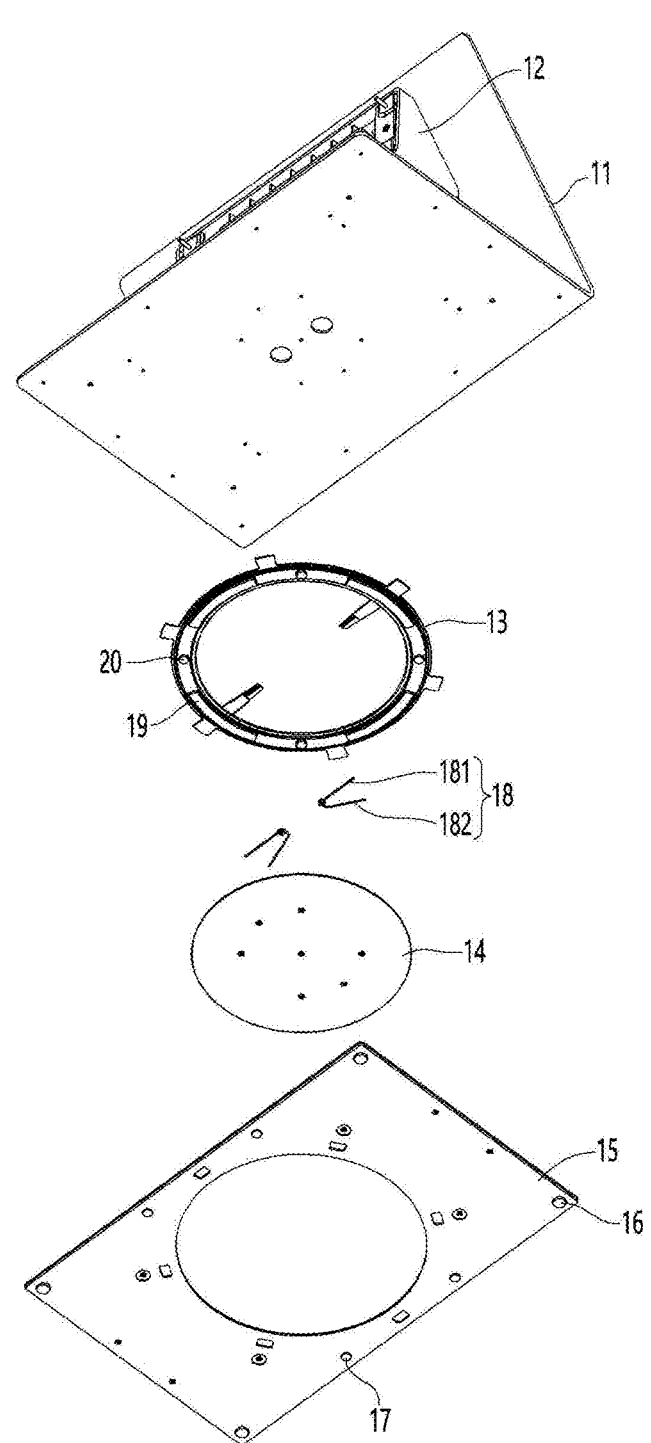

【FIG. 5】
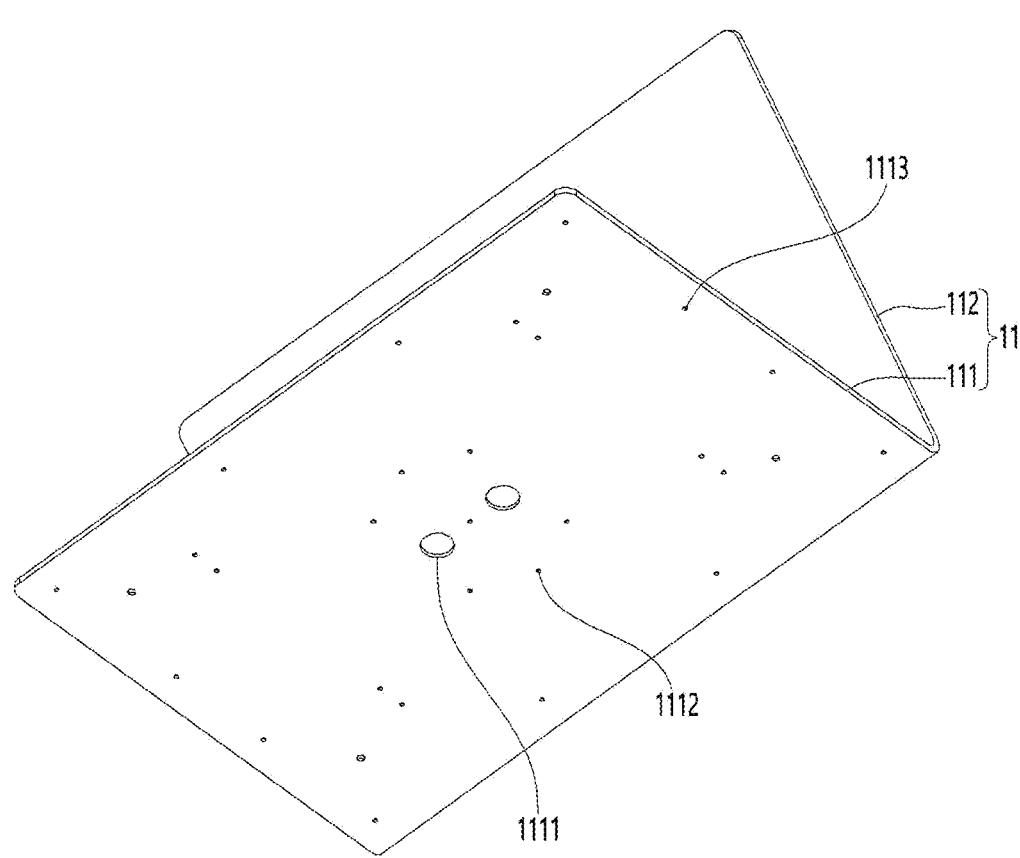

[FIG. 6]
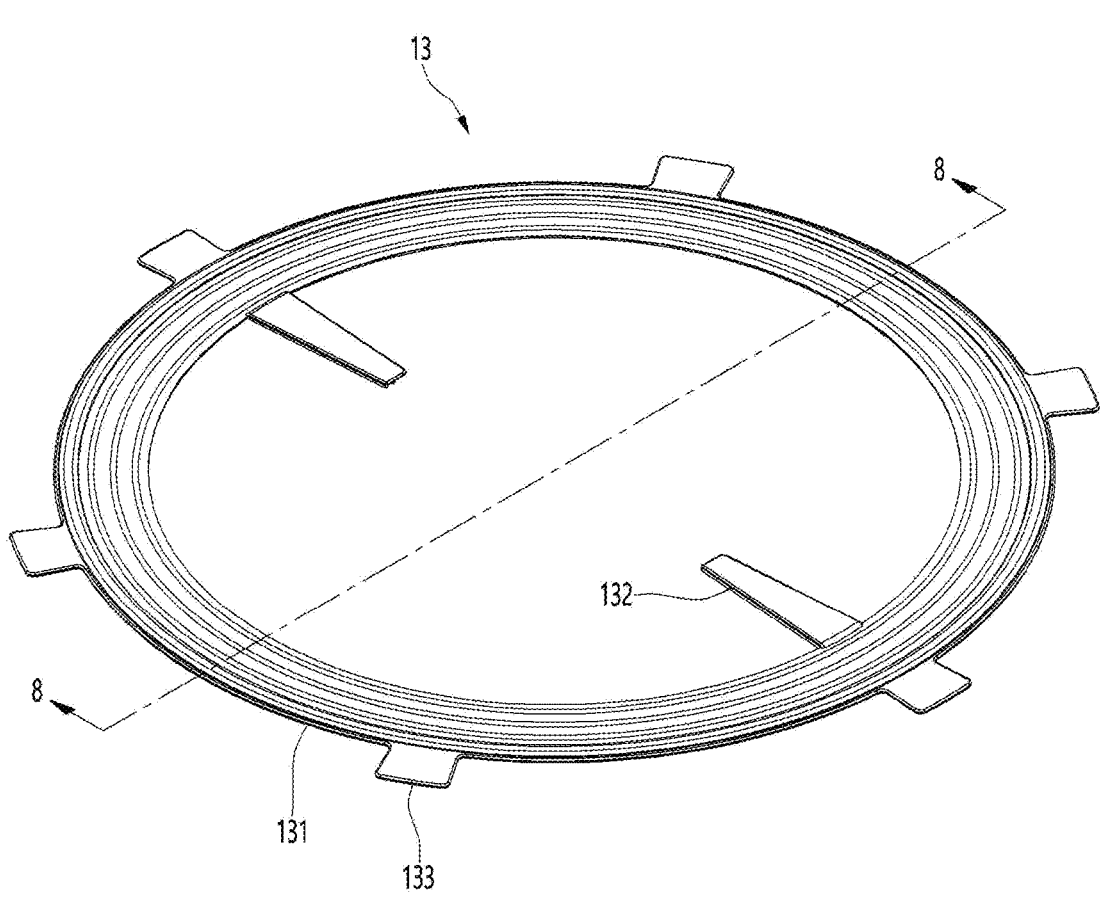

【FIG. 7】
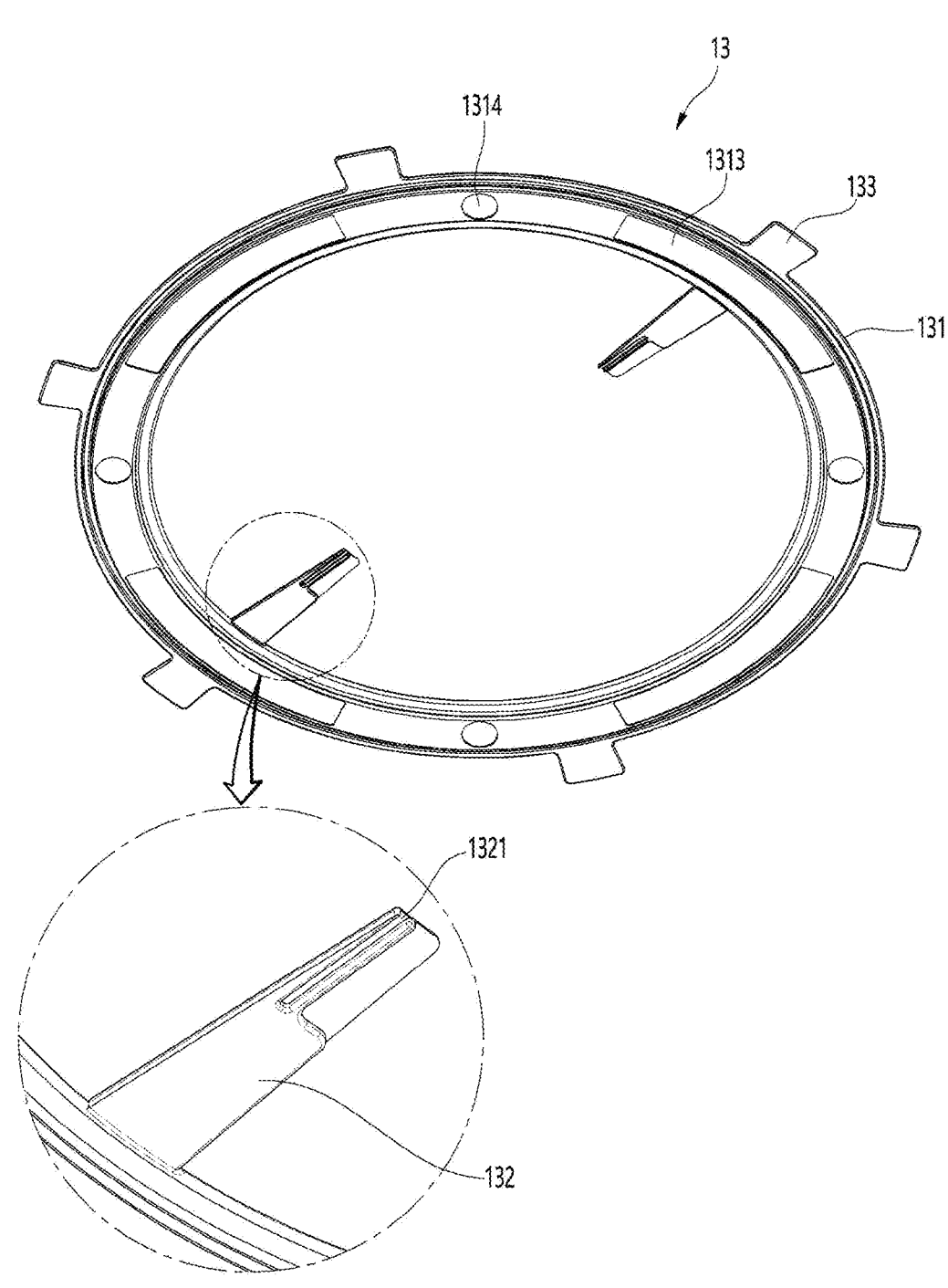

【FIG. 8】
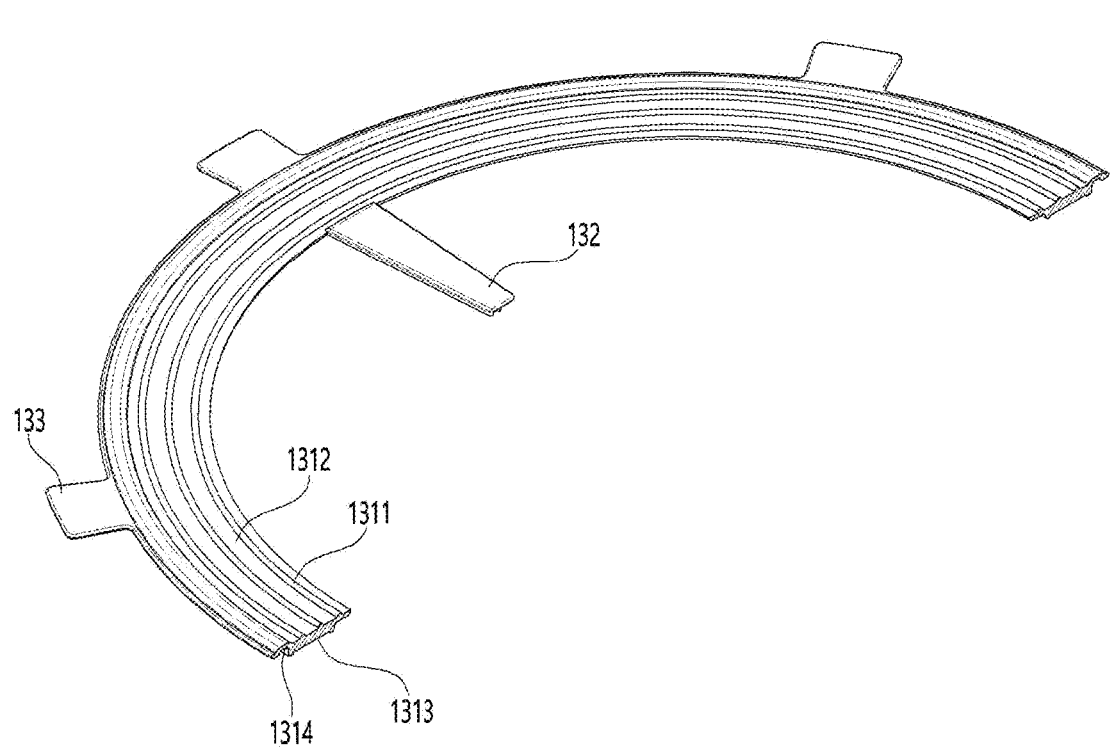

【FIG. 9】
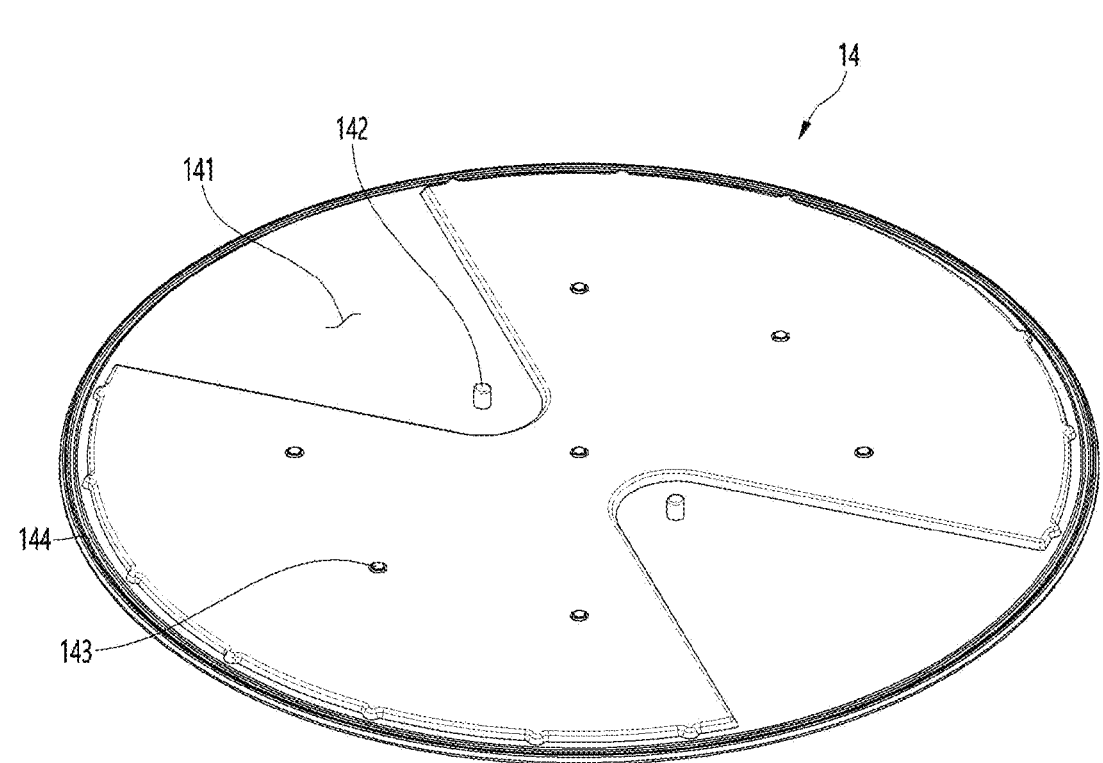

【FIG. 10】
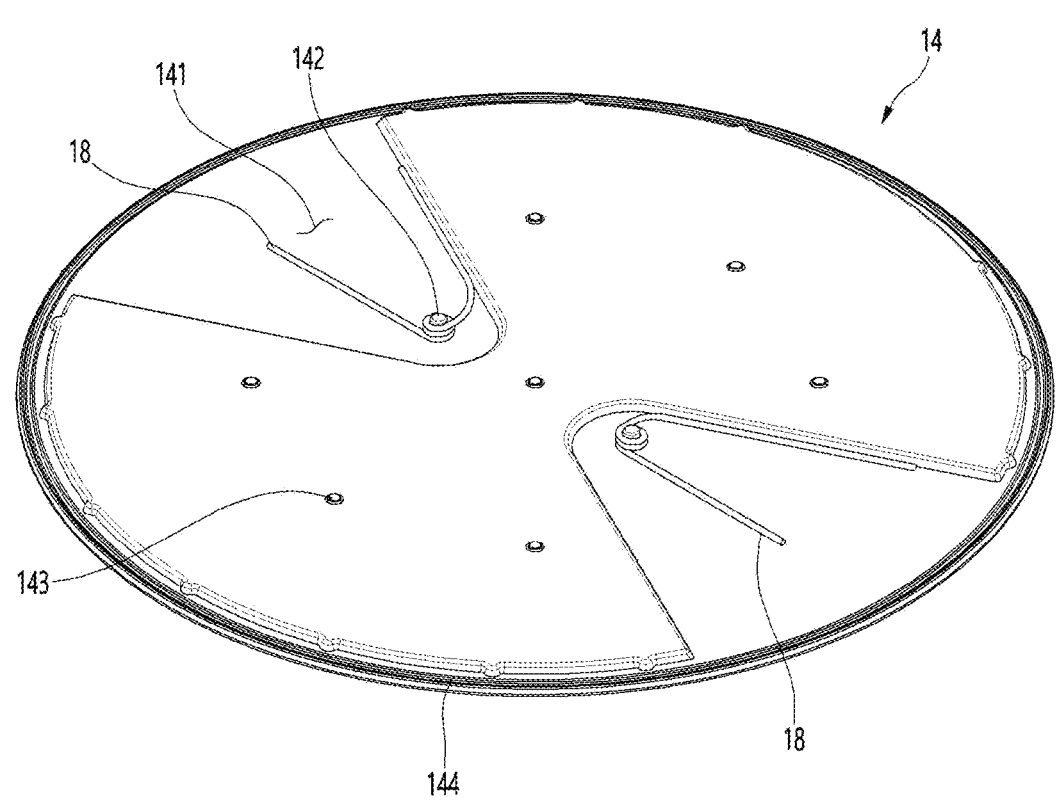

[FIG. 11]

[FIG. 12]
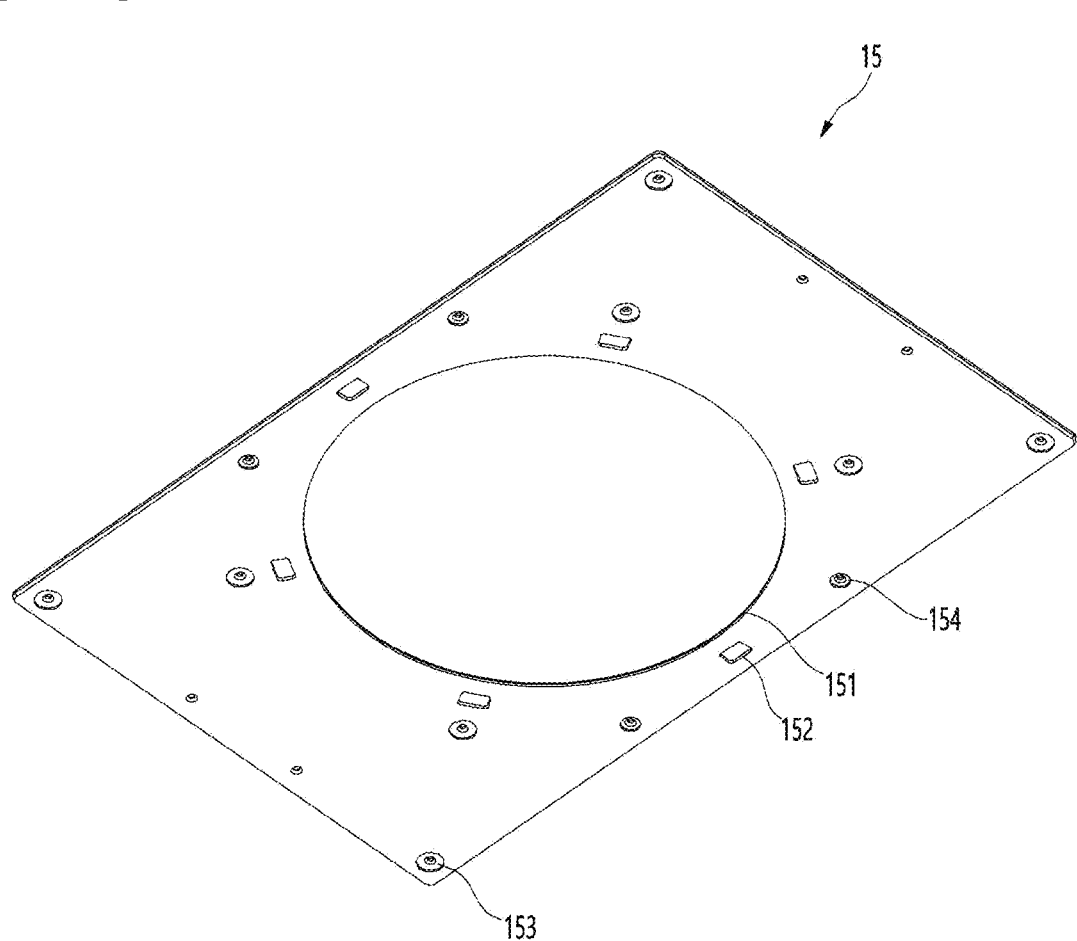

[FIG. 13]
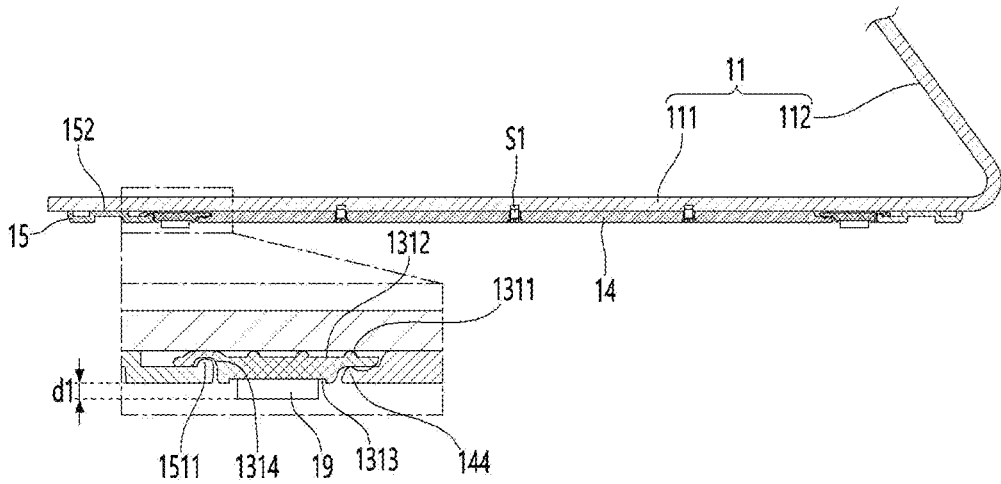
[FIG. 14]
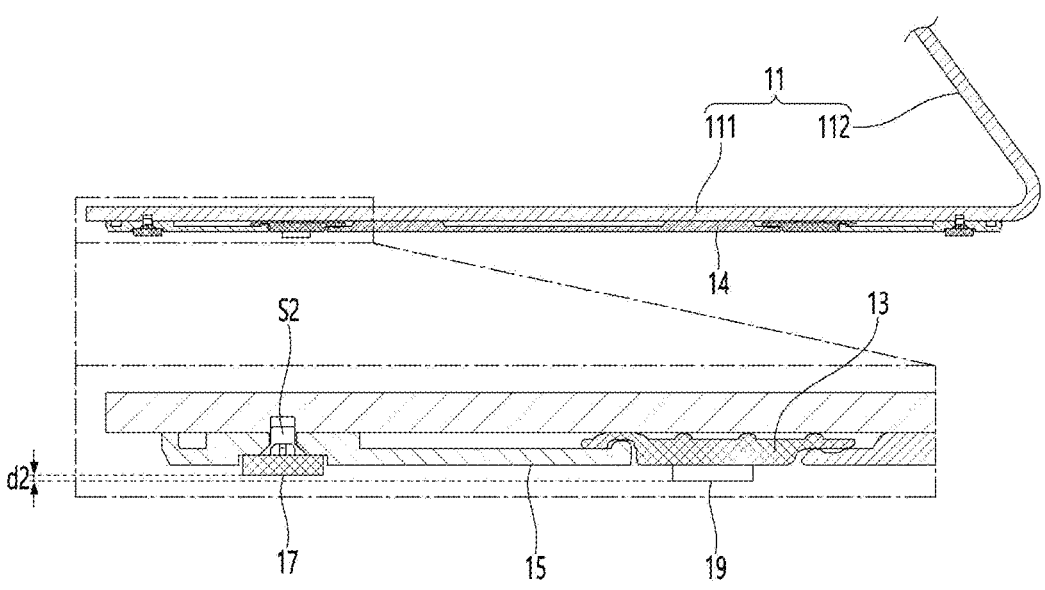

【FIG. 15】
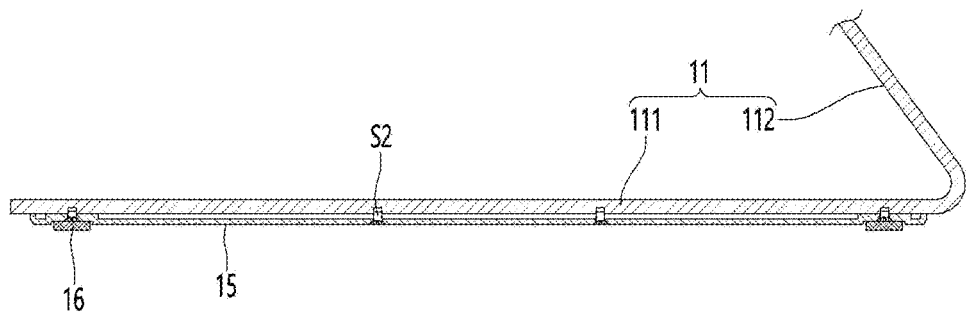
【FIG. 16】
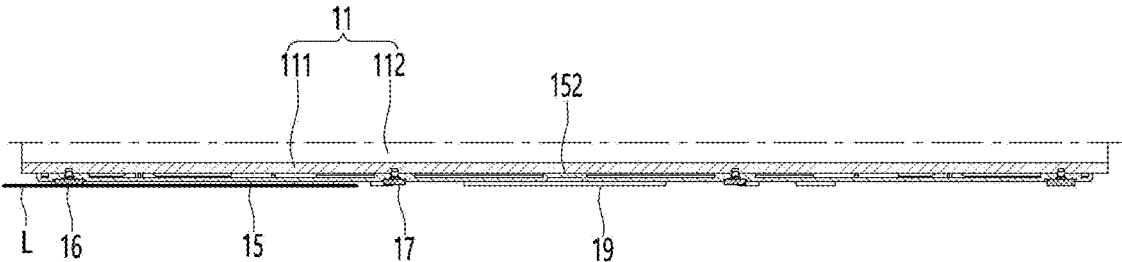

【FIG. 17】
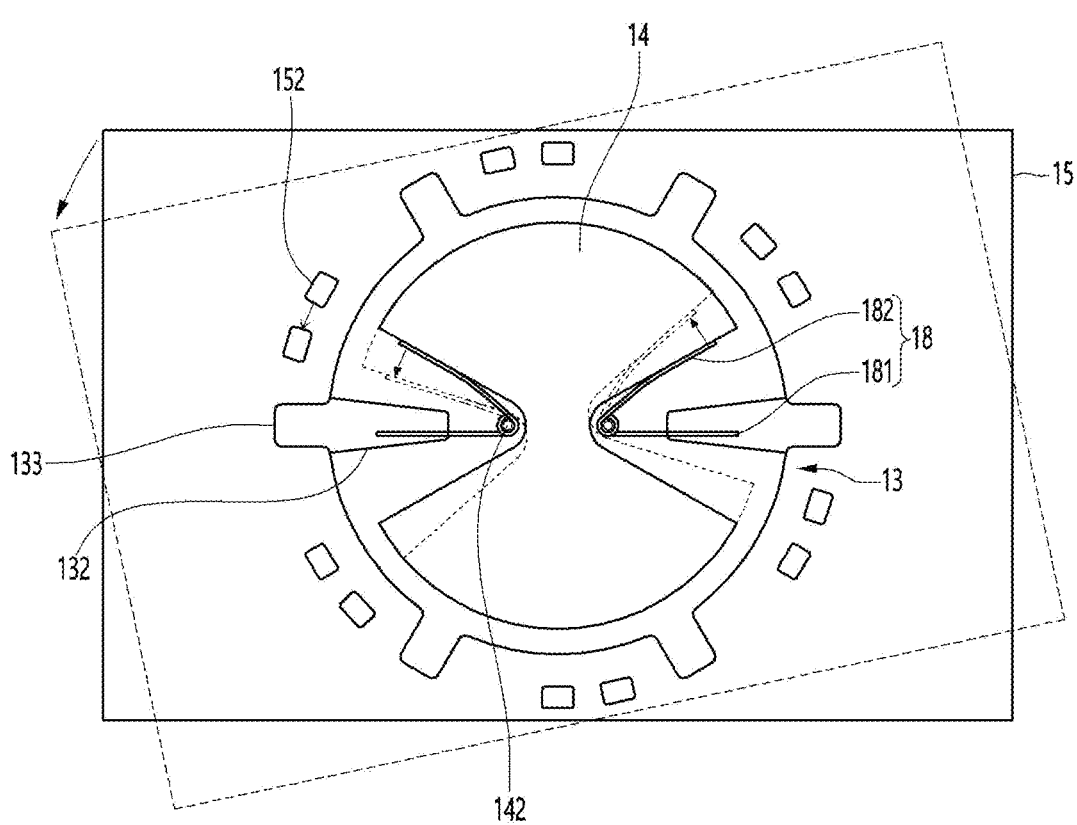

SUPPORT APPARATUS AND DISPLAY DEVICE HAVING SAME

CROSS REFERENCE TO RELATED APPLICATIONS

This application is the National Phase of PCT International Application No. PCT/KR2022/009663, filed on Jul. 5, 2022, which is incorporated by reference into the present application.

BACKGROUND

Technical Field

The present invention relates to a support device for supporting a display panel and a display device having the same.

Discussion of the Related Art

Korean Patent Publication No. 10-0609852 (Aug. 8, 2006) discloses a display device having a swivel function in which the display body rotates around a vertical axis with respect to the installation surface.

In detail, a swivel means for implementing a swivel function is provided on a bottom surface of the support device. Then, when the display panel is rotated clockwise or counterclockwise around a vertical axis, the swivel means is fixed to the installation surface, and the display panel and the base rotate around the vertical axis.

SUMMARY

The purpose of the present invention is to provide a support device that enables a display panel and a support device to rotate as one body about a vertical axis with respect to an installation surface, and a display device having the support device.

In addition, the purpose is to provide a support device and a display device having the same that allows a swivel means to return to an original position when the display device is separated from the installation surface in a state where the display panel is rotated around a vertical axis together with the support device.

In addition, the purpose is to provide a support device and a display device equipped with the same that can minimize the thickness of the bottom portion placed on an installation surface by minimizing the number of components for implementing a swivel function and simplifying the structure of the configuration implementing the swivel function.

In order to achieve the object, according to an embodiment of the present invention, a support device comprises: a stand body supporting the display panel; a swivel ring rotatably placed on a bottom surface of the stand body; a swivel cover fixed to the bottom surface of the stand body on an inner side of the swivel ring and supporting an inner edge of the swivel ring; a stand base fixed to the bottom surface of the stand body and supporting an outer edge of the swivel ring; and a fixing pad mounted on a bottom surface of the swivel ring and in close contact with an installation surface on which the display panel is placed.

The stand body includes: a mounting portion placed on the installation surface, and having a bottom surface to which the swivel ring and the stand base are coupled; a support portion extending upwardly and having a front surface on which a panel bracket to support the display panel is mounted.

The support portion is configured to be inclined and extend upward at a rear end of the mounting portion by an angle less than 90 degrees from the mounting portion to the securing portion.

The stand body is formed in such a manner that a plate having a predetermined thickness is bent.

The support device according to an embodiment of the present invention further comprises slip rubbers mounted on bottom surfaces of four corners of the stand base, respectively.

Bottom surfaces of the slip rubber and the fixing pad are coplanar to each other, in a state where the slip rubber and the fixing pad are respectively mounted on the bottom surface of the stand base and the bottom surface of the swivel ring.

The bottom surface of the slip rubber is in contact with the installation surface, in a state where the stand body to which the display panel is coupled is placed on the installation surface.

A Teflon coating layer is formed on at least the bottom surface of the slip rubber.

The support device according to an embodiment of the present invention further comprises support rubbers mounted on front and rear ends of the bottom surface of the stand base, respectively.

The bottom surface of the support rubber is spaced apart from the installation surface by a predetermined distance, in a state where the stand body to which the display panel is coupled is placed on the installation surface.

The swivel ring is formed in a circular band shape with a predetermined width, the swivel cover is formed in a circular plate shape corresponding to the inner diameter of the swivel ring, and a bottom surface of an inner edge of the swivel ring and an upper surface of an edge of the swivel cover overlap in the radial direction by a predetermined width.

On an upper surface of the edge of the swivel cover overlapping the swivel ring, at least one contact projection that contacts the lower surface of the inner edge of the swivel ring is protruded, and the at least one contact projection is formed in a shape of a continuous circular band that surrounds the edge of the swivel cover, or a shape that a plurality of dots are arranged in a circumferential direction along the edge of the swivel cover.

A through hole through which the swivel ring penetrates is formed in the stand base, and an upper surface of an inner edge of the stand base and a bottom surface of an outer edge of the swivel ring overlap in the radial direction by a predetermined width.

A guide projection is protruded on the upper surface of the inner edge of the stand base overlapping the swivel ring, a guide groove is formed on a bottom surface of the outer edge of the swivel ring that overlaps the stand base, to receive the guide projection, and the guide protrusion is formed in a shape of a continuous circular band surrounding an edge of the through hole, or a shape that a plurality of dots are arranged in a circumferential direction along the edge of the through hole.

A plurality of contact projections protrude from an upper surface of the swivel ring and extend in a circumferential direction to come in contact with a bottom surface of the mounting portion, and a lubricating groove provided with a lubricant is formed in a space between adjacent contact projections.

A fixing pad mounting groove to receive the fixing pad is formed on the lower surface of the swivel ring.

The support device according to an embodiment of the present invention further comprises: one or more catching protrusions protruding radially from an outer edge of the swivel ring; and a plurality of limiting protrusions protruding from an upper surface of the stand base to limit the rotational amount of the one or more catching protrusions, wherein the catching protrusion is arranged between two circumferentially adjacent limiting projections.

The support device according to an embodiment of the present invention further comprises: at least one spring support arm extending centrally from the inner edge of the swivel ring; and at least one torsion spring placed on an upper surface of the swivel cover and has one end connected to the spring support arm.

The torsion spring includes: a center portion coiled in a coil shape; a fixed end extending from the center portion to be connected to the spring support arm; and a free end extending from the center portion.

A spring receiving portion for receiving the at least one torsion spring is formed to be recessed from the upper surface of the swivel cover, and the free end contacts with an edge of the spring receiving portion.

The spring receiving portion is formed in a shape in which a width increases radially outward from the center of the swivel cover, and a support shaft protrudes from an inner edge of the spring receiving portion to penetrate and support the center portion of the torsion spring.

A spring insertion groove into which the fixed end is inserted is formed on a bottom surface of the spring support arm.

The spring support arm and the spring receiving portion are provided in a symmetrical shape with respect to a line passing through the center of the swivel cover.

Advantageous Effects

A support device according to an embodiment of the present invention having the configuration and a display device equipped therewith have the following effects.

Firstly, there is an advantage in that the load on the support device is reduced, allowing the user to carry the display device without great difficulty.

Secondly, since the thickness of the bottom of the support device that is installed on the installation surface becomes thinner, the center of gravity of the display device is lowered, thereby reducing the possibility of falling down of the display device.

Thirdly, it is advantageous that, in a state where the display device has been rotated about a vertical axis, the swivel means returns to its original portion when the display is lifted from the installation surface.

BRIEF DESCRIPTION OF THE DRAWINGS

FIG. 1 is a front perspective view of a display device including a support device according to an embodiment of the present invention.

FIG. 2 is a front perspective view of the support device.

FIG. 3 is a bottom perspective view of the support device.

FIG. 4 is an exploded perspective view of the support device.

FIG. 5 is a bottom perspective view of a stand body constituting a support device according to an embodiment of the present invention.

FIG. 6 is a plan perspective view of a swivel ring constituting a support device according to an embodiment of the present invention.

FIG. 7 is a bottom perspective view of the swivel ring.

FIG. 8 is a cutaway perspective view of the swivel ring taken along line 8-8 of FIG. 6.

FIG. 9 is a perspective view of a swivel cover constituting a support device according to an embodiment of the present invention.

FIG. 10 is a drawing showing the position returning means installed on the swivel cover.

FIG. 11 is a plan perspective view of a stand base constituting a support device according to an embodiment of the present invention.

FIG. 12 is a bottom perspective view of the stand base.

FIG. 13 is a cross-sectional view of the support device taken along line 13-13 of FIG. 3.

FIG. 14 is a cross-sectional view of the support device taken along line 14-14 of FIG. 3.

FIG. 15 is a longitudinal cross-sectional view of the support device taken along line 15-15 of FIG. 3.

FIG. 16 is a cross-sectional view of the support device taken along line 16-16 of FIG. 3.

FIG. 17 is a bottom view of the display device illustrating the mechanism by which the swivel ring is restored to its original position.

DETAILED DESCRIPTION OF THE EMBODIMENTS

Hereinafter, a support device and a display device having the same according to an embodiment of the present invention will be described in detail with reference to the drawings.

FIG. 1 is a front perspective view of a display device including a support device according to an embodiment of the present invention, FIG. 2 is a front perspective view of the support device, FIG. 3 is a bottom perspective view of the support device, and FIG. 4 is an exploded perspective view of the support device.

Referring to FIGS. 1 to 4, a display device 1 according to an embodiment of the present invention includes a display panel 30 on which an image is output, and a support device 10 that supports the display panel 30.

In detail, the support device 10 includes a stand body 11 placed on an installation surface and a panel bracket 12 connecting the stand body 11 and the display panel 30.

The stand body 11 includes a mounting portion 111 placed on an installation surface and a support portion 112 extending upward from a rear end of the mounting portion 111. The support portion 112 may be extended upwardly at an angle of less than 90 degrees with the mounting portion 111. That is, the stand body 11 may have a shape in which a square plate is folded at an angle of less than 90 degrees. In addition, a panel bracket 12 may be fixed to an upper front side of the support portion 112.

Since the support portion 112 extends at an angle of less than 90 degrees from the rear end of the mounting portion 111, the load of the display panel 10 coupled to the panel bracket 12 can be stably supported.

Meanwhile, a swivel means is attached to the stand body 11, specifically to a bottom surface of the mounting portion 111.

In detail, the swivel means includes: a stand base 15 and a swivel cover 14 which are fixed to the bottom surface of the mounting portion 111; and a swivel ring 13 coupled to the bottom surface of the mounting portion 111. The swivel cover 14 may be formed in a circular plate shape, and the swivel ring 13 may be formed in a circular ring shape having a predetermined width. The stand base 15 may be formed in a shape and size corresponding to the shape and size of the mounting portion 111. In detail, the stand base 15 may have the same shape as the mounting portion 111, but may be formed slightly smaller than the mounting portion 111 so that the mounting portion 111 may not be exposed to an outside when placed on the installation surface.

The swivel means may optionally include a position returning means 18 for returning the swivel ring 13 to its original position when separated from the installation surface.

The swivel means may optionally include one or more slip rubbers 16 mounted on the bottom surface of the stand base 15.

The swivel means may optionally include one or more support rubbers 17 mounted on the bottom surface of the stand base 15.

The swivel means may optionally include one or more fixing pads 19 mounted on the bottom surface of the swivel ring 13.

The swivel means may optionally include one or more fixing rubbers 20 mounted on the bottom surface of the swivel ring 13.

The position returning means 18 may be a torsion spring comprising a center portion wound in a coil shape, and a fixed end 181 and a free end 182 extending from the center portion. The position returning means 18 may be provided symmetrically on left and right sides with respect to the center of the mounting portion 111.

In addition, the original position of the swivel ring 13 can be understood as meaning the position before the display panel 30 rotates clockwise or counterclockwise in a state where the display device 1 is placed on the installation surface. In other words, it can be understood as meaning the position of the ground state in which no external force is applied to the position returning means 18 and thus no restoring force is accumulated to the returning means 18.

When the display device 1 is placed on the installation surface, the swivel ring 13 remains in a state of being tightly fixed to the installation surface. Then, when the display panel 30 is rotated around the vertical axis, the stand body 11, the swivel cover 14, and the stand base 15 rotate as one body.

FIG. 5 is a bottom perspective view of a stand body constituting a support device according to an embodiment of the present invention.

In detail, a support shaft receiving groove 1111 that receives the upper end of a support shaft 192 (See FIG. 9) to be described later is formed on the bottom surface of the mounting portion 111 that constitutes the stand body 11.

The support shaft receiving grooves 1111 can be formed at points spaced left and right from the center of the mounting portion 111, respectively.

In addition, a plurality of fastening holes may be formed in the mounting portion 111, and the plurality of fastening holes may include a plurality of swivel cover fastening holes 1112 and a plurality of stand base fastening holes 1113.

The plurality of swivel cover fastening holes 1112 can be arranged in the circumferential direction of the swivel cover 13.

The plurality of stand base fastening holes 1113 can be formed at the edge of the mounting portion 111.

FIG. 6 is a plan perspective view of a swivel ring constituting a support device according to an embodiment of the present invention, FIG. 7 is a bottom perspective view of the swivel ring, and FIG. 8 is a cut-away perspective view of the swivel ring taken along line 8-8 of FIG. 6.

Referring to FIGS. 6 to 8, a swivel ring 13 constituting the support device 10 according to an embodiment of the present invention includes a ring body 131, a spring support arm 132, and a plurality of catching protrusions 133.

In detail, the ring body 131 is formed in a shape of a circular ring plate having a predetermined width, and the width of the ring body 131 can be defined as the difference between the inner diameter and the outer diameter of the ring body 131.

The spring support arm 132 extends a predetermined length from the inner edge of the ring body 131 toward the center of the ring body 131.

The plurality of catching protrusions 133 extend radially outward from the outer edge of the ring body 131 and are spaced apart in the circumferential direction of the ring body 131.

On the upper surface of the ring body 131, a plurality of contact protrusions 1311 having different diameters may protrude in a circular band shape. That is, the plurality of contact protrusions 1311 may be formed to be spaced apart from the inner edge of the ring body 131 by a predetermined interval towards the outer edge. In addition, a space formed between two adjacent contact protrusions 1311 may be defined as a lubrication groove 1312, and the lubrication groove 1312 may be filled with a lubricant such as grease.

As another example, each of the plurality of contact protrusions 1311 may be provided in a form of a plurality of dots protruding in a hemispherical shape and spaced apart in the circumferential direction.

The bottom surface of the inner edge of the ring body 131 is placed on the upper surface of the outer edge of the swivel cover 14, and the bottom surface of the outer edge of the ring body 1311 is placed on the upper surface of the inner edge of the stand base 15. In addition, since the swivel cover 14 and the stand base 15 are joined to the bottom surface of the mounting portion 111, the swivel ring 13 is coupled to the mounting portion 111 in a state where it can rotate relative to the mounting portion 111.

A guide groove 1314 is formed in a shape of a circular band on the bottom surface of the outer edge of the ring body 1311.

In addition, a plurality of fixing pad mounting grooves 1313 may be formed on the bottom surface of the ring body 131. The fixing pad 19 may be formed in an arc shape and may be formed of a material having a high coefficient of friction. For example, the fixing pad 19 may be formed of a material such as silicone, rubber or a fiber material such as a non-woven fabric.

The plurality of fixing pad mounting grooves 1313 may be spaced apart from each other in the circumferential direction on the bottom surface of the ring body 131. However, the present invention is not limited thereto, and the fixing pad mounting grooves 1313 may be provided in the form of a single groove over the entire bottom surface of the ring body 131. That is, not only may a plurality of fixing pads 19 formed in an arc shape be spaced apart from each other on the bottom surface of the ring body 131, but it is also possible for a single circular fixing pad 19 to be mounted on the bottom surface of the ring body 131.

Optionally, a fixing rubber mounting groove 1314 may be formed between adjacent arc-shaped fixing pad mounting grooves 1313. The fixing rubber 20 mounted in the fixing rubber mounting groove 1314 may be formed of the same material as that of the fixing pad 19.

Meanwhile, a spring insertion groove 1321 is formed on the bottom surface of the spring support arm 132. The fixed end 181 of the torsion spring corresponding to the position returning means 18 is fitted into the spring insertion groove 1321.

FIG. 9 is a perspective view of a swivel cover constituting a support device according to an embodiment of the present invention, and FIG. 10 is a drawing showing a position returning means mounted on the swivel cover.

Referring to FIGS. 9 and 10, the swivel cover 14 constituting the support device 10 according to an embodiment of the present invention may be formed in a circular shape.

In detail, as described above, the bottom surface of the inner edge of the swivel ring 13 is slidably seated on the upper surface of the edge of the swivel cover 14. That is, when the display panel 30 rotates around the vertical axis, the upper surface of the edge of the swivel cover 14 rotates while in contact with the bottom surface of the swivel ring 13.

In order to minimize the frictional force generated at the contact area between the swivel cover 14 and the swivel ring 13, one or more contact protrusions 144 may protrude from the upper edge surface of the swivel cover 14 that overlaps the inner edge of the swivel ring 13.

The contact protrusion 144 may be protruded in a continuous circular band shape, and a plurality of circular band-shaped contact protrusions 144 having different diameters may be spaced apart in the radial direction of the swivel cover 14.

As another example, the contact protrusion 144 may protrude from the upper surface of the swivel cover 14 in a hemispherical shape. That is, a plurality of hemispherical contact protrusions 144 may be spaced apart from each other in the circumferential direction of the swivel cover 14 to form a circular band composed of a plurality of dots. In addition, a plurality of circular bands composed of a plurality of dots may be spaced apart from each other in the radial direction of the swivel cover 14.

In other words, circular band-shaped contact protrusions having different diameters are spaced apart in the radial direction of the swivel cover 14, and each of the circular band-shaped contact protrusions may be formed of a number of hemispherical protrusions, i.e., dots.

Meanwhile, a pair of spring receiving portions 141 may be formed on the upper surface of the swivel cover 14, and the torsion spring is mounted in each of the pair of spring receiving portions 141.

The pair of spring receiving portions 141 may be provided in a form that is symmetrical to each other with respect to a line passing through the center of the swivel cover 14. In addition, the pair of spring receiving portions 141 may be provided in a form that is recessed downward from the upper surface of the swivel cover 14 to a predetermined depth or stepped to a predetermined depth.

Each of the pair of spring receiving portions 141 may be provided in a form in which the width becomes wider from the center to the edge of the swivel cover 14. Accordingly, the line connecting the edges of the spring receiving portions 141 may be formed in a parabolic or V shape.

In addition, a support shaft 142 protrudes from the inner edge of the spring receiving portion 141, and the support shaft 142 penetrates the center of the torsion spring.

And, when the swivel cover 14 is coupled to the bottom surface of the mounting portion 111, the support shaft 142 is received in the support shaft receiving groove 1111 of the mounting portion 111, thereby preventing interference between the support shaft 142 and the mounting portion 111.

In addition, since the center of the torsion spring is accommodated within the support shaft accommodation groove 1111, the phenomenon of the torsion spring leaving the spring accommodation portion 141 is prevented.

In addition, as shown in FIG. 10, the free end 182 of the torsion spring contacts one of the two edges of the spring receiving portion 141. And, the fixed end 181 of the torsion spring is fitted into the spring insertion groove 1321 formed on the bottom surface of the spring support arm 132.

Meanwhile, a plurality of fastening holes 143 are formed in the swivel cover 14, and one of the plurality of fastening holes 143 is formed in the center of the swivel cover 14, and the rest are arranged in the circumferential direction of the swivel cover 14 at a position spaced apart from the center of the swivel cover 14 by a predetermined distance. A fastening member S1 (See FIG. 13) penetrating each of the plurality of fastening holes 143 is inserted into the swivel cover fastening hole 1112 formed in the mounting portion 111.

Figure 11:
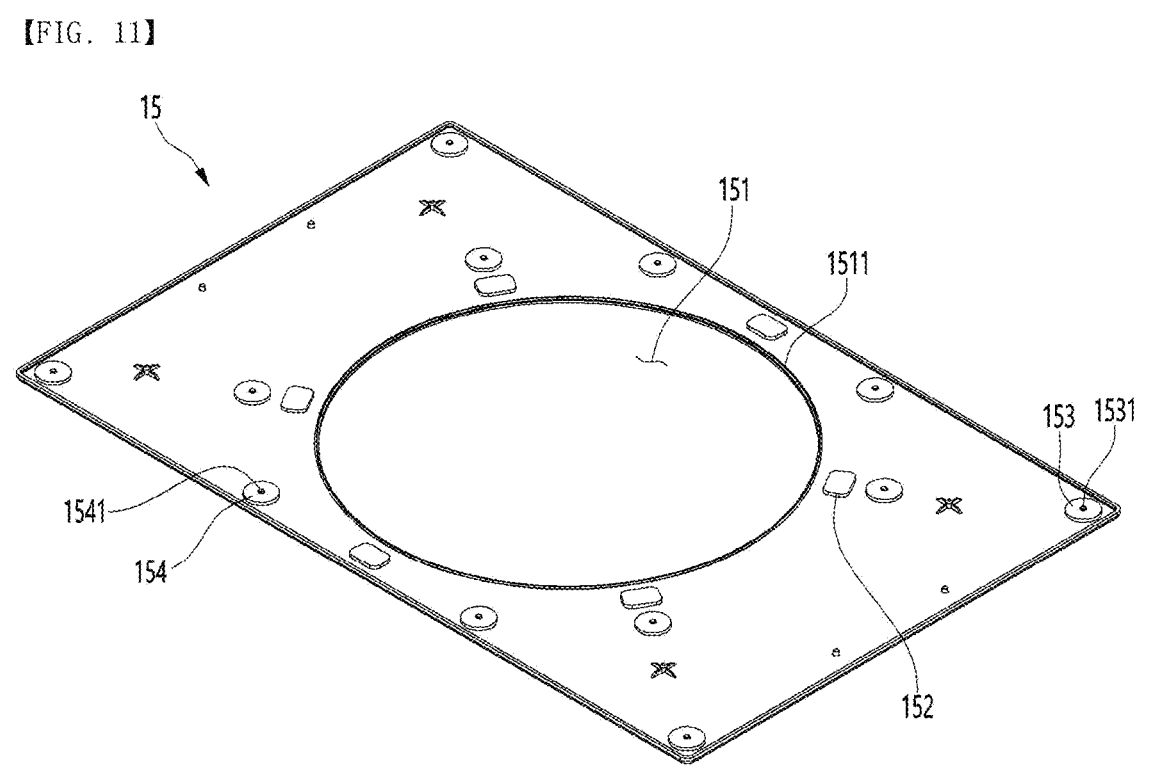

FIG. 11 is a plan perspective view of a stand base constituting a support device according to an embodiment of the present invention, and FIG. 12 is a bottom perspective view of the stand base.

Referring to FIGS. 11 and 12, the stand base 15 constituting the support device 10 according to the embodiment of the present invention may be formed in the same shape as the mounting portion 111.

In detail, a through hole 151 is formed in the stand base 15, and a guide protrusion 1511 protrudes at the edge of the through hole 151. The guide protrusion 1511 extends along the edge of the through hole 151 and is received in the guide groove 1314 formed on the lower surface of the outer edge of the ring body 131.

The guide protrusion 1511 may also be formed in a continuous circular band shape like the contact protrusion 144, or may be a collection of multiple dots arranged along the edge of the through hole.

In addition, a plurality of limiting protrusions 152 are protruded from the upper surface of the stand base 15, and the plurality of limiting protrusions 152 are spaced apart from each other along the edge of the through hole 151. In addition, the catching protrusion 133 of the swivel ring 13 is positioned between the adjacent limiting protrusions 152, so that the display panel 30 can rotate around the vertical axis by the rotation angle of the catching protrusion 133. In other words, the combination of the display panel 30 and the stand body 11 can rotate clockwise or counterclockwise by the angle at which the catching protrusion 133 extends from one of the two adjacent limiting protrusions 152 to the other.

In order for the catching protrusion 133 to be hooked on the limiting protrusion 152, the limiting protrusion 152 is positioned within the rotation radius of the hooking projection 144. That is, the distance from the center of the stand base 15 to the end of the catching protrusion 133 is designed to be at least greater than the distance from the center of the stand base 15 to the inner end of the limiting protrusion 152.

Slip rubber mounting grooves 153 are formed at the four corners of the stand base 15, and the slip rubber mounting grooves 153 are formed by being recessed upward from the bottom surface of the stand base 15. In addition, a fastening hole 1531 may be formed at the center of the slip rubber mounting groove 153.

In addition, one or more support rubber mounting grooves 154 may be formed at each of the front and rear ends of the stand base 15. The support rubber mounting groove 154 may also be formed to be recessed upward like the slip rubber mounting groove 153, and a fastening hole 1541 may be formed at the center of the support rubber mounting groove 154.

In this embodiment, the front and rear ends of the stand base 15 can be understood as edges of long side portions, and the left and right ends as edges of short side portions. In addition, in this embodiment, two support rubber mounting grooves 154 are described as being formed at the front and rear ends of the stand base 15, respectively, but it should be noted that this is not limited thereto.

FIG. 13 is a longitudinal cross-sectional view of the support device taken along line 13-13 of FIG. 3, FIG. 14 is a longitudinal cross-sectional view of the support device taken along line 14-14 of FIG. 3, FIG. 15 is a longitudinal cross-sectional view of the support device taken along line 15-15 of FIG. 3, and FIG. 16 is a longitudinal cross-sectional view of the support device taken along line 16-16 of FIG. 3.

Referring to FIG. 13, in a state where the swivel ring 13 is rotatably attached to the bottom surface of the mounting portion 111, the swivel cover 14 is fixed to the bottom surface of the mounting portion 111 by the fastening member S1. Then, the upper edge of the swivel cover 14 overlaps the bottom surface of the inner edge of the swivel ring 13. At this time, one or more contact protrusions 144 protruding from the upper edge of the swivel cover 14 come in contact with the bottom surface of the inner edge of the swivel ring 13.

As shown in FIG. 14, when the stand base 15 is fixed to the bottom surface of the mounting portion 111 by the fastening member S2, the guide protrusion 1511 protruding from the upper surface of the edge of the through hole 151 is mounted on the guide groove 1314 formed on the bottom surface of the outer edge of the swivel ring 13.

Here, when the swivel ring 13 is in close contact with the bottom surface of the mounting portion 111, only the plurality of contact protrusions 1311 protruding from the upper surface of the swivel ring 13 make linear contact or narrow surface contact with the bottom surface of the mounting portion 111, so that the frictional force generated between the mounting portion 111 and the swivel ring 13 can be minimized. Furthermore, the frictional force can be further reduced by the lubricant filled in the lubricant grooves 1312 between the plurality of contact protrusions 1311.

Meanwhile, in the state where the display device 1 is placed on the installation surface, when the display panel 30 is rotated around the vertical axis, the stand body 11, the stand base 15 and the swivel cover 14 rotate as one body, and the swivel ring 13 remains fixed to the installation surface. That is, the fixing pad 19 and the fixing rubber 20 attached to the lower surface of the swivel ring 13 are tightly fixed to the installation surface, so that the swivel ring 13 does not rotate, and the stand base 15 and the swivel cover 14 rotate relative to the swivel ring 13.

The bottom surface of the fixing pad 19 and the bottom surface of the stand base 15 are spaced apart by a predetermined distance d1. Then, the fixing pad 19 may be compressed by the load of the display panel 30 and the stand body 11, so that the distance d1 may be reduced. However, the thickness and elasticity of the fixing pad 19 may be set so that the bottom surface of the stand base 15 does not touch the installation surface, even if the distance d1 is reduced. The distance d1 may be defined as a first distance, and may be 2.0 mm as an example.

In addition, the bottom surface of the support rubber 17 and the bottom surface of the fixing pad 19 are spaced apart by a predetermined distance d2. In addition, when the display device 1 is placed on the installation surface, the distance d2 may be reduced by the load of the display panel 30 and the stand body 11, but the bottom surface of the support rubber 17 is designed not to touch the installation surface.

However, when a force is applied to the display panel 30 to push it forward or backward, the support rubber 17 comes into contact with the installation surface, thereby preventing the display device 1 from falling over.

The gap d2 can be defined as a second gap and can be 0.7 mm as an example.

Referring to FIGS. 15 and 16, the thickness of each of the slip rubber 16 and the fixing pad 19 can be set so that the bottom surface of the slip rubber 16 and the bottom surface of the fixing pad 19 are placed on the same horizontal plane L.

Alternatively, the thickness of the slip rubber 16 may be set so that the slip rubber 16 comes into contact with the installation surface when the display device 1 is placed on the installation surface and the fixing pad 19 is compressed by the load of the display panel 30 and the stand body 11.

A coating treatment for reducing friction may be applied to the bottom surface of the slip rubber 16. As an example, the coating includes a Teflon coating. Accordingly, when the display device 1 is placed on the installation surface and the display panel 30 is swiveled around the vertical axis, the slip rubber 16 slides smoothly while in contact with the installation surface. In addition, almost no friction occurs between the slip rubber 16 and the installation surface due to the Teflon coating layer.

FIG. 17 is a bottom view of the display device illustrating the mechanism by which the swivel ring returns to its original position.

Referring to FIG. 17, when the display device 1 is lifted from the installation surface in a state where the display panel 30 is swiveled clockwise or counterclockwise around the vertical axis, the swivel ring 13 rotates to return to the original position by the restoring force of the position returning means 18, i.e., the torsion spring.

In detail, when the user rotates the display panel 30 in the direction of the arrow, the stand body 11, swivel cover 14 and stand base 15 also rotate as one body, while the swivel ring 13 remains fixed to the installation surface by the frictional force of the fixing pad 19.

And, as the display panel 30 rotates, the free end 182 of the torsion spring is pressed by the edge of the spring receiving portion 141 formed in the swivel cover 14 and is bent in the direction of the arrow. That is, as the free end 182 of the torsion spring is bent in a direction closer to the fixed end 181, restoring force is accumulated in the torsion spring.

In this state, the frictional force generated between the slip rubber 16 and the installation surface due to the load of the display panel 30 and the stand body 11 acts greater than the restoring force of the torsion spring. As a result, even if the force for rotating the display panel 30 is removed, the display panel 30 does not return to the original position by the restoring force of the torsion spring and maintains the rotated state.

However, when the user lifts the display device 1 from the installation surface in that state where the display panel 30 is swiveled, the swivel ring 13 rotates by the restoring force of the torsion spring, and the display panel 30 returns to the position before it rotated, i.e., the original position.

To this end, it is desirable to design the spring coefficient of the torsion spring and/or the friction coefficient of the coating layer of the slip rubber 16 so that the minimum frictional force between the slip rubber 16 and the installation surface acts greater than the maximum restoring force of the torsion spring.

The invention claimed is:

1. A support device supporting a display panel, comprising:
   a display panel;
   a stand body supporting the display panel;
   a swivel ring rotatably placed on a bottom surface of the stand body;
   a swivel cover fixed to the bottom surface of the stand body on an inner side of the swivel ring and supporting an inner edge of the swivel ring;
   a stand base fixed to the bottom surface of the stand body and supporting an outer edge of the swivel ring;
   a fixing pad mounted on a bottom surface of the swivel ring and in close contact with an installation surface on which the display panel is placed;
   slip rubbers respectively mounted on bottom surfaces of four corners of the stand base; and
   support rubbers respectively mounted on front and rear ends of the bottom surface of the stand base.

2. The support device according to claim 1, wherein the stand body includes:
   a mounting portion placed on the installation surface, and having a bottom surface to which the swivel ring and the stand base are coupled; and
   a support portion extending upwardly and having a front surface on which a panel bracket to support the display panel is mounted, and
   wherein the support portion is configured to be inclined and extend upward at a rear end of the mounting portion by an angle less than 90 degrees from the mounting portion to a securing portion.

3. The support device according to claim 2, wherein the swivel ring is formed in a circular band shape with a predetermined width,
   wherein the swivel cover is formed in a circular plate shape corresponding to the inner diameter of the swivel ring, and
   wherein a bottom surface of an inner edge of the swivel ring and an upper surface of an edge of the swivel cover overlap in the radial direction by a predetermined width.

4. The support device according to claim 3, wherein, on an upper surface of the edge of the swivel cover overlapping the swivel ring, at least one contact projection that contacts the lower surface of the inner edge of the swivel ring is protruded, and
   wherein the at least one contact projection is formed in a shape of a continuous circular band that surrounds the edge of the swivel cover.

5. The support device according to claim 3, wherein a through hole through which the swivel ring penetrates is formed in the stand base, and
   wherein an upper surface of an inner edge of the stand base and a bottom surface of an outer edge of the swivel ring overlap in the radial direction by a predetermined width.

6. The support device according to claim 5, wherein a guide projection is protruded on the upper surface of the inner edge of the stand base overlapping the swivel ring,
   wherein a guide groove is formed on a bottom surface of the outer edge of the swivel ring that overlaps the stand base, to receive the guide projection, and

wherein the guide protrusion is formed in a shape of a continuous circular band surrounding an edge of the through hole.

7. The support device according to claim 2, wherein a plurality of contact protrusions having different diameters protrudes from an upper surface of the swivel ring and extend in a circumferential direction to come in contact with a bottom surface of the mounting portion, and
   wherein a lubricating groove provided with a lubricant is formed in a space between adjacent contact protrusions, and wherein a fixing pad mounting groove to receive the fixing pad is formed on the lower surface of the swivel ring.

8. The support device according to claim 2, further comprising:
   one or more catching protrusions protruding radially from an outer edge of the swivel ring; and
   a plurality of limiting protrusions protruding from an upper surface of the stand base to limit the rotational amount of the one or more catching protrusions,
   wherein the catching protrusion is arranged between two circumferentially adjacent limiting projections.

9. The support device according to claim 1, wherein bottom surfaces of the slip rubber and the fixing pad are coplanar to each other, in a state where the slip rubber and the fixing pad are respectively mounted on the bottom surface of the stand base and the bottom surface of the swivel ring.

10. The support device according to claim 1, wherein a bottom surface of the slip rubber is in contact with the installation surface, in a state where the stand body to which the display panel is coupled is placed on the installation surface.

11. The support device according to claim 1, wherein a coating layer is formed on at least a bottom surface of the slip rubber.

12. The support device according to claim 1, wherein a bottom surface of the support rubber is spaced apart from the installation surface by a predetermined distance, in a state where the stand body to which the display panel is coupled is placed on the installation surface.

13. A support device supporting a display panel, comprising:
   a display panel;
   a stand body supporting the display panel;
   a swivel ring rotatably placed on a bottom surface of the stand body;
   a swivel cover fixed to the bottom surface of the stand body on an inner side of the swivel ring and supporting an inner edge of the swivel ring;
   a stand base fixed to the bottom surface of the stand body and supporting an outer edge of the swivel ring;
   a fixing pad mounted on a bottom surface of the swivel ring and in close contact with an installation surface on which the display panel is placed,
   at least one spring support arm extending centrally from the inner edge of the swivel ring; and
   at least one torsion spring placed on an upper surface of the swivel cover and has one end connected to the spring support arm.

14. The support device according to claim 13, wherein the torsion spring includes:
   a center portion coiled in a coil shape;
   a fixed end extending from the center portion to be connected to the spring support arm; and
   a free end extending from the center portion.

15. The support device according to claim 14, wherein a spring receiving portion for receiving the at least one torsion spring is formed to be recessed from the upper surface of the swivel cover, and wherein the free end contacts with an edge of the spring receiving portion.

16. The support device according to claim 15, wherein the spring receiving portion is formed in a shape in which a width increases radially outward from the center of the swivel cover, and wherein a support shaft protrudes from an inner edge of the spring receiving portion to penetrate and support the center portion of the torsion spring.

17. The support device according to claim 15, wherein a spring insertion groove into which the fixed end is inserted is formed on a bottom surface of the spring support arm.

18. The support device according to claim 15, wherein the spring support arm and the spring receiving portion are provided in a symmetrical shape with respect to a line passing through the center of the swivel cover.

19. A display device, comprising:

a display panel; and a support device according to claim 2, which supports the display panel.

\* \* \* \* \*